(12) United States Patent
Hamdoon et al.

(10) Patent No.: US 10,000,948 B2
(45) Date of Patent: Jun. 19, 2018

(54) CRASH SAFETY LOCKING DEVICE FOR A MOTOR VEHICLE DOOR

(71) Applicant: FORD GLOBAL TECHNOLOGIES, LLC, Dearborn, MI (US)

(72) Inventors: Muhsin M. Hamdoon, Windsor (CA); Marwan Ahmad Elbkaily, Canton, MI (US); Daniel Carl Bejune, Southfield, MI (US); Yalla Mussa Abushawashi, Canton, MI (US); Bruce Richard Ghastin, Canton, MI (US); Bakhtyar Baig, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 15/261,081

(22) Filed: Sep. 9, 2016

(65) Prior Publication Data

US 2018/0073279 A1    Mar. 15, 2018

(51) Int. Cl.
*B62D 25/20* (2006.01)
*E05B 77/12* (2014.01)

(52) U.S. Cl.
CPC .............. *E05B 77/12* (2013.01); *B62D 25/20* (2013.01)

(58) Field of Classification Search
CPC ................................. E05B 77/12; B62D 25/20
USPC ............................ 296/187.03, 187.12, 146.6
See application file for complete search history.

(56) References Cited

U.S. PATENT DOCUMENTS

| 3,819,228 | A | * | 6/1974 | Cornacchia | B60J 5/0458 292/DIG. 65 |
|---|---|---|---|---|---|
| 6,659,537 | B2 | | 12/2003 | Moriyama et al. | |
| 7,311,169 | B1 | | 12/2007 | Caliskan et al. | |
| 8,661,617 | B1 | | 3/2014 | Kim | |
| 2005/0127715 | A1 | | 6/2005 | Carre | |
| 2006/0000145 | A1 | * | 1/2006 | Yoshida | B60J 5/06 49/360 |

FOREIGN PATENT DOCUMENTS

| CN | 103573027 A | 2/2014 |
|---|---|---|
| DE | 102005023123 A1 | 3/2006 |
| DE | 102009041353 A1 | 4/2010 |
| DE | 102009058750 A1 | 6/2011 |
| DE | 102011121670 A1 | 8/2012 |
| DE | 102012020696 A1 | 5/2013 |
| DE | 102012020698 A1 | 5/2013 |
| DE | 102012108180 A1 | 5/2014 |
| JP | 2005330717 A | 12/2005 |

(Continued)

OTHER PUBLICATIONS

English Machine Translation of CN103573027A.
(Continued)

*Primary Examiner* — Joseph D. Pape
(74) *Attorney, Agent, or Firm* — Jason Rogers; King & Schickli, PLLC (57) ABSTRACT

A locking device is provided for a door of a motor vehicle. That locking device includes a pin having a first end fixed to the door and a second end including an enlarged head. The locking device also includes a receiver on a rocker panel of the motor vehicle. When the door is subjected to a side impact the pin extends into the receiver and is captured to lock the door closed. A related method is also disclosed.

18 Claims, 8 Drawing Sheets

(56) References Cited

FOREIGN PATENT DOCUMENTS

JP          2007062563 A       3/2007

OTHER PUBLICATIONS

English Machine Translation of DE102005023123A1.
English Machine Translation of DE102009041353A1.
English Machine Translation of DE102009058750A1.
English Machine Translation of DE102011121670A1.
English Machine Translation of DE102012020696A1.
English Machine Translation of DE102012020698A1.
English Machine Translation of DE102012108180A1.
English Machine Translation of JP2005330717A.
English Machine Translation of JP2007062563A.

* cited by examiner

CRASH SAFETY LOCKING DEVICE FOR A MOTOR VEHICLE DOOR

TECHNICAL FIELD

This document relates generally to the motor vehicle equipment field and, more particularly, to a locking device and method adapted to lock a motor vehicle door in a closed position in response to a side impact.

BACKGROUND

The 20 mile per hour oblique pole side impact test is performed in order to test the integrity of the door system of a motor vehicle. More specifically, the door should stay latched/closed during a test or simulated crash event.

This document relates to a new and improved locking device and related method of locking a motor vehicle door closed in response to a side impact such as the one simulated by the 20 mile per hour oblique pole test.

SUMMARY

In accordance with the purposes and benefits described herein, a locking device is provided for a door of a motor vehicle. That locking device comprises (1) a pin including a first end fixed to the door and a second end including an enlarged head and (2) a receiver on a rocker panel of the motor vehicle. When the door is subjected to a side impact, the pin extends into the receiver and is captured.

The pin may include a shank carrying the enlarged head. Further, the first end of the pin may be threaded to allow for easy mounting to the door of the motor vehicle. In addition, a washer may be provided on the pin between the first end and the shank.

A screw drive may also be provided on the enlarged head to aid in mounting the pin to the door. As should be appreciated the enlarged head may form a continuous shoulder around the shank of the pin.

The receiver may include a cover closing the receiver. Further, the receiver may include an aperture in an outer rocker panel of the motor vehicle. A second aperture may be provided in the door opening panel of the motor vehicle. The first and second apertures may be aligned.

Still further, the first end of the pin may have a first diameter $D_1$, the shank may have a second diameter $D_2$, the enlarged head may have a third diameter $D_3$ and the aperture may have a fourth diameter $D_4$ where $D_1<D_2<D_3<D_4$. Still further, a ratio of $D_1:D_2:D_3:D_4$ may be between 1:1.23:1.98:2.98 and 1:1.43:2.18:3.18. In addition, the shank may have a length $L_1$ of between 35 mm and 45 mm while the shoulder may have a depth of between 4.0 mm and 5.0 mm. Still further, the ratio of $D_2:L_1$ may be between 1:2.25 and 1:2.75.

In addition, the pin may be canted motor vehicle rearward when the door is closed. In some embodiments, the pin is canted motor vehicle rearward at an angle of between 17 degrees and 23 degrees when the door is closed.

In accordance with another aspect, a method is provided for locking a door of a motor vehicle closed in response to a side impact. That method may comprise the steps of: (1) extending a pin on the door into a receiver on a rocker panel in the motor vehicle in response to the side impact and (b) subsequently bending the pin so that the shoulder on the pin engages with a lip of the receiver to thereby capture the pin and lock the door closed.

The method may further include the step of penetrating a cover that is provided over the receiver when the pin is extended into the receiver. In addition, the method may include the steps of providing the shoulder continuously around the pin and providing the lip continuously around the receiver. The continuous shoulder and continuous lip function to provide locking engagement between the pin and receiver no matter which direction the pin is bent as a result of the side impact. Advantageously, this ensures the capturing of the pin and the locking of the door in the closed position in response to substantially any foreseeable side impact of sufficient force to cause the pin to penetrate the receiver and bend in any direction.

In the following description, there are shown and described several preferred embodiments of the locking device and the method. As it should be realized, the locking device and method are capable of other, different embodiments and their several details are capable of modification in various, obvious aspects all without departing from the locking device and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the locking device and the related method and together with the description serve to explain certain principles thereof. In the drawing figures.

Reference will now be made in detail to the present preferred embodiments of the locking device, examples of which are illustrated in the accompanying drawing figures.

DETAILED DESCRIPTION

Reference is now made to FIGS. 1-4e illustrating the locking device 10 that is particularly adapted for locking a door 12 of a motor vehicle closed in response to a side impact. As illustrated best in FIG. 1, the locking device 10 includes a pin 14 having a first end 16, a shank 18 and a second end including an enlarged head 20. The first end 16 is threaded and may be fixed to the door 12 by means of the hex nut 22. More specifically, in the illustrated embodiment, the pin 14 is secured to the door 12 by capturing the door inner panel 24 between the hex nut 22 and the washer 26 that seats against the shank 18. A screw drive 28, such as the illustrated star drive, may be provided in the end of the enlarged head 20 in order to allow turning of the pin 14 with a star drive tool. As will become apparent from the following description, the enlarged head 20 forms a continuous shoulder 30 around the shank 18.

Figure 2:
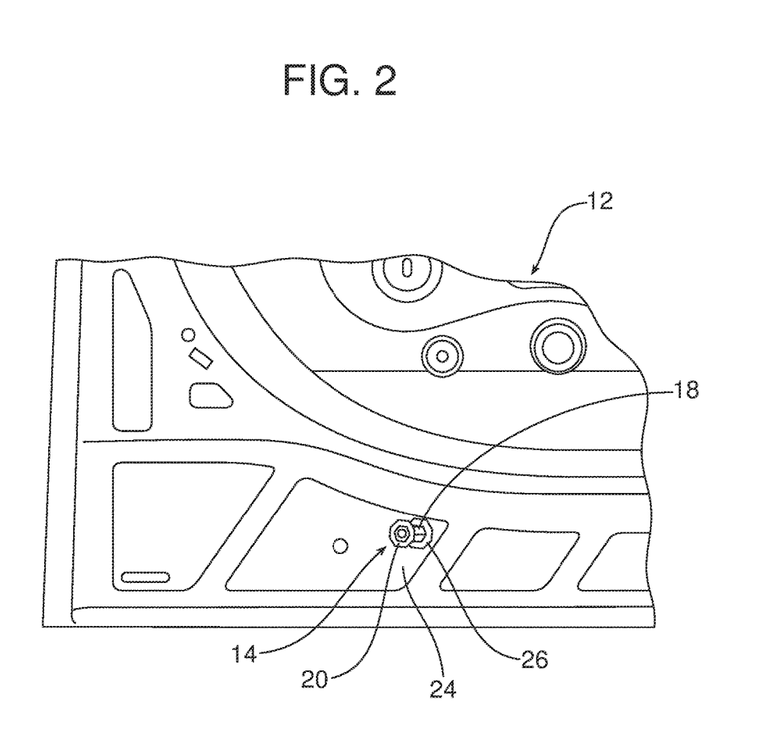
FIG. 2 is a front plan view illustrating the pin of FIG. 1 secured to the door of the motor vehicle.

As best illustrated in FIG. 2, when properly mounted on the door 12, the pin 14 projects motor vehicle inward. As shown, the pin 14 may be canted motor vehicle rearward when the door 12 is closed. More specifically, in some embodiments the pin 14 is canted motor vehicle rearward at an angle between 17 degrees and 23 degrees. In one particularly useful embodiment the pin 14 is canted rearwardly at 20 degrees as illustrated in FIG. 2.

Figure 3:
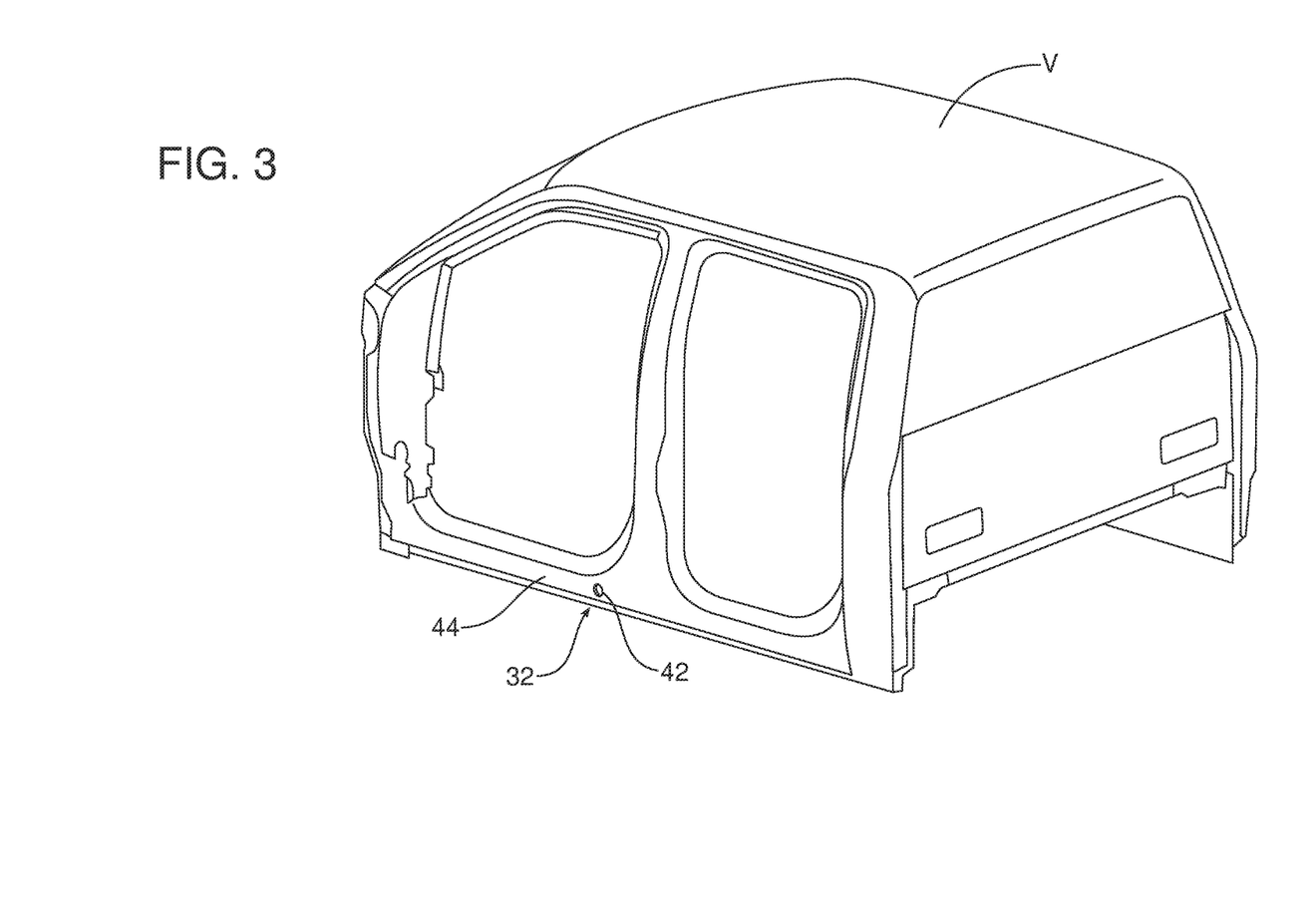
FIG. 3 is a perspective view illustrating the location of the receiver of the locking device on the door opening panel.
Figure 4A:
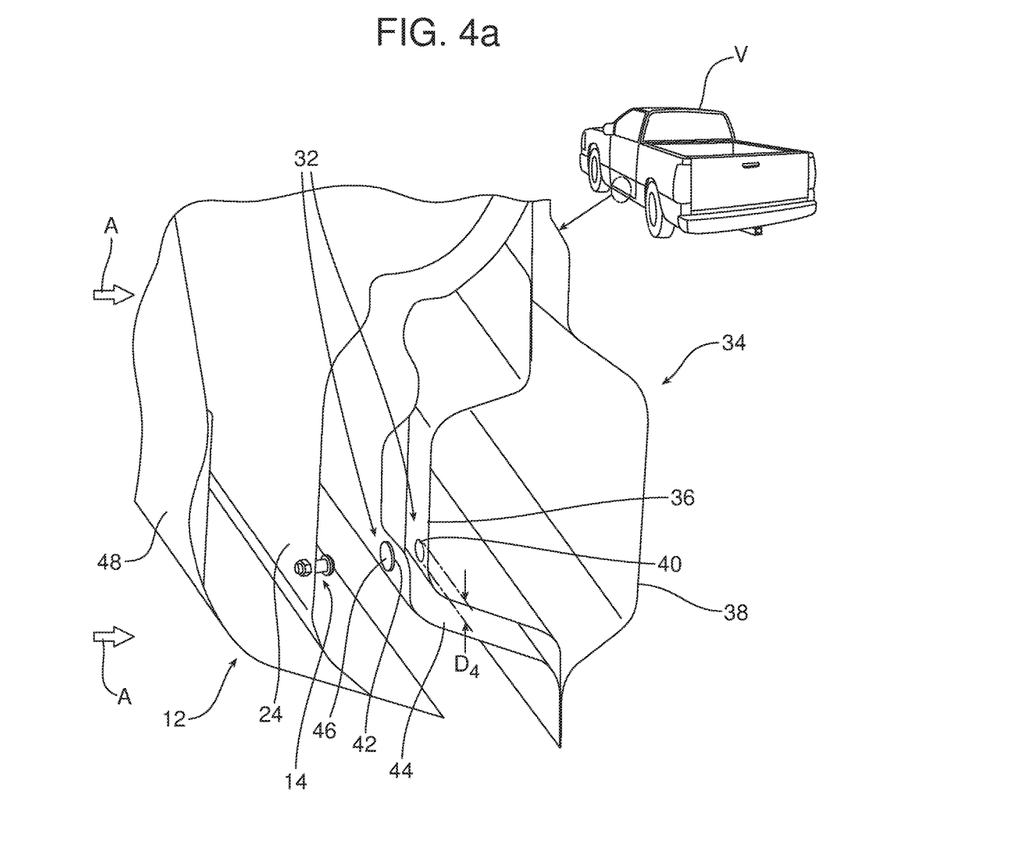
FIGS. 4a-4e are a series of views illustrating how the locking device functions to lock a door of the motor vehicle in a closed position in response to a side impact.

As illustrated in FIGS. 3 and 4a, the locking device 10 also includes a receiver 32 provided on a rocker panel 34 of the motor vehicle V. More specifically, in the illustrated embodiment, the rocker panel 34 includes an outer rocker panel 36 and an inner rocker panel 38. The receiver 32 comprises an aperture 40 provided in the outer rocker panel 36. Further, the receiver 32 includes a second aperture 42 in the door opening panel 44. The first aperture 40 in the outer rocker panel 36 and the second aperture 42 in the door opening panel 44 are aligned. A cup or cover 46 is held in the second aperture 42 of the door opening panel 44 in order to close and seal the door opening panel 44 and rocker panel 34 from water intrusion. Thus, the cup or cover 46 functions as a seal which may easily be punctured by the enlarged head 20 of the pin 14 in the event of a side impact in a manner described below.

Figure 1:
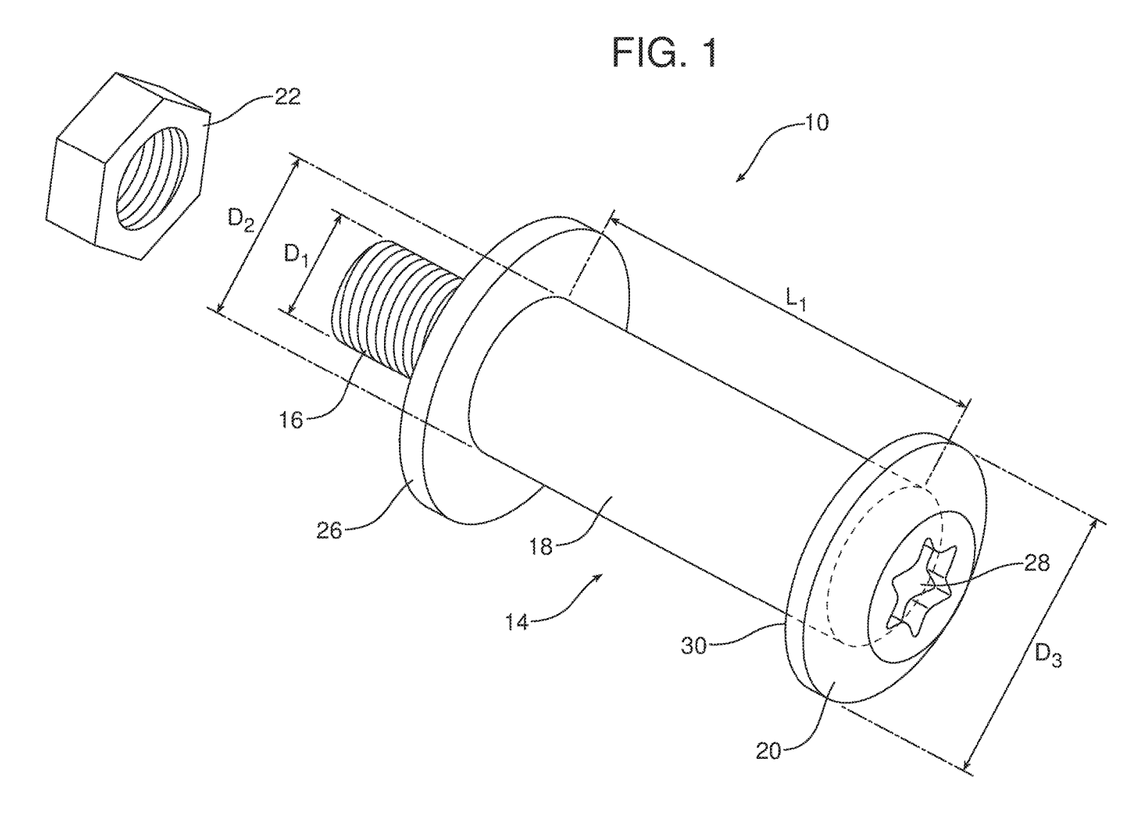
FIG. 1 is a detailed perspective view of the pin of the locking device that is secured to a door of the motor vehicle.

The threaded first end 16 of the pin 14 has a first diameter $D_1$. The shank 18 at the pin 14 has a second diameter $D_2$. The enlarged head 20 of the pin 14 has a third diameter $D_3$. The aperture 40 in the outer rocker panel 36 has a fourth diameter $D_4$ where $D_1 < D_2 < D_3 < D_4$. The ratio of $D_1:D_2:D_3:D_4$ may be between 1:1.23:1.98:2.98 and 1:1.43:2.18:3.18. The shank 18 has a length $L_1$ extending from the washer 26 to the enlarged head 20 of between 35 mm and 45 mm. In addition, the shoulder 30 has a depth of between 4.0 mm and 5.0 mm. The ratio of the second diameter $D_2$ of the shank 18 to the length $L_1$ of the shank may be between 1:2.22 and 1:2.75. As should be appreciated, these relative shoulder depths, diameter ratios and shank lengths are illustrative of just one particular embodiment of the proposed locking device and the locking device 10 should not be considered as limited thereto.

Reference is now made to FIGS. 4a-4e which illustrate a method of locking a door 12 of a motor vehicle closed in response to a side impact. FIG. 4a illustrates the construction of the door 12 and the rocker panel 34 prior to side impact. As illustrated, the pin 14 is secured to the door inner panel 24 with the door inner panel 24 captured between the hex nut 22 and the washer 26 and the door outer panel 48 concealing the hex nut from view. The pin 14 extends or projects inwardly from the door inner panel 24 toward the receiver 32 including, particularly, the cover 46 overlying the second aperture 42 in the door opening panel 44.

Figure 4B:
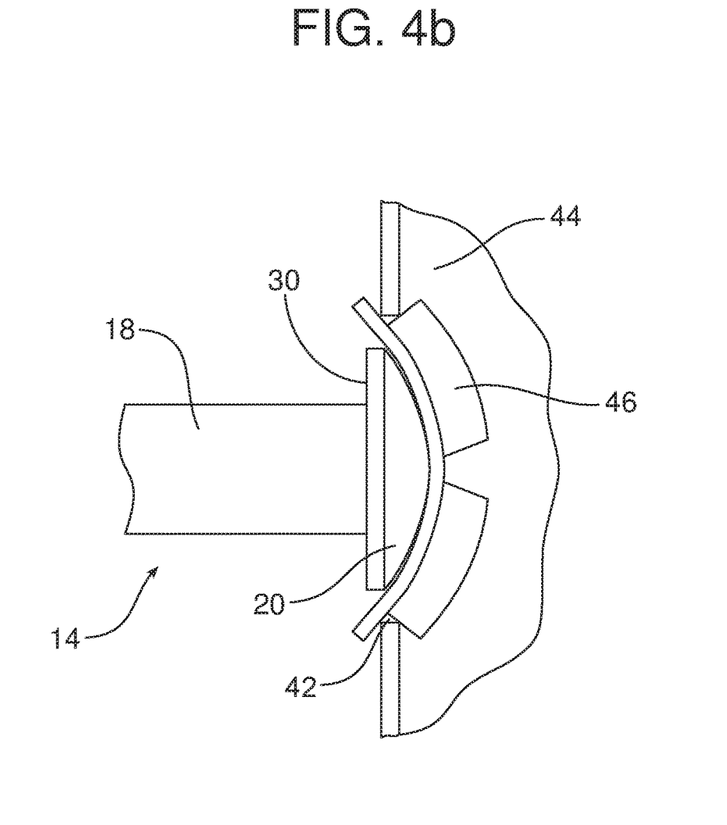

Upon application of a side impact as illustrated by action arrows A, the door 12 crumples inward in the direction of action arrows A toward the rocker panel 34 so that the enlarged head 20 on the pin 14 penetrates the cover 46 over the second aperture 42 in the door opening panel 44 (see FIG. 4b).

Figure 4C:
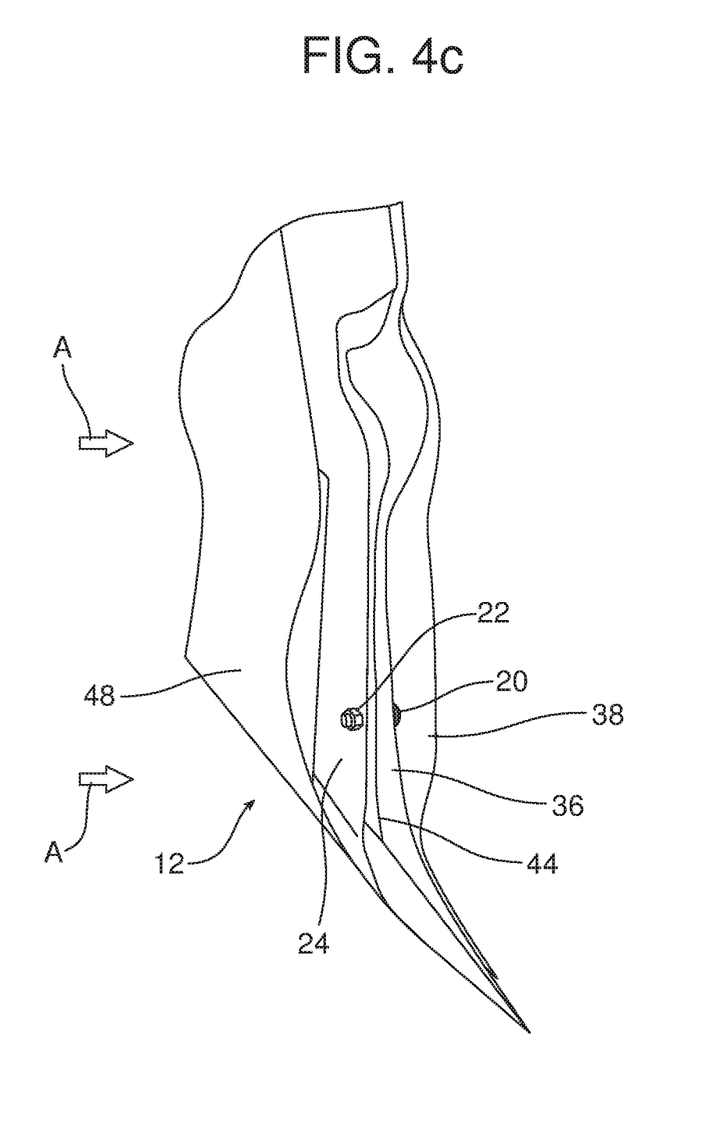
Figure 4D:
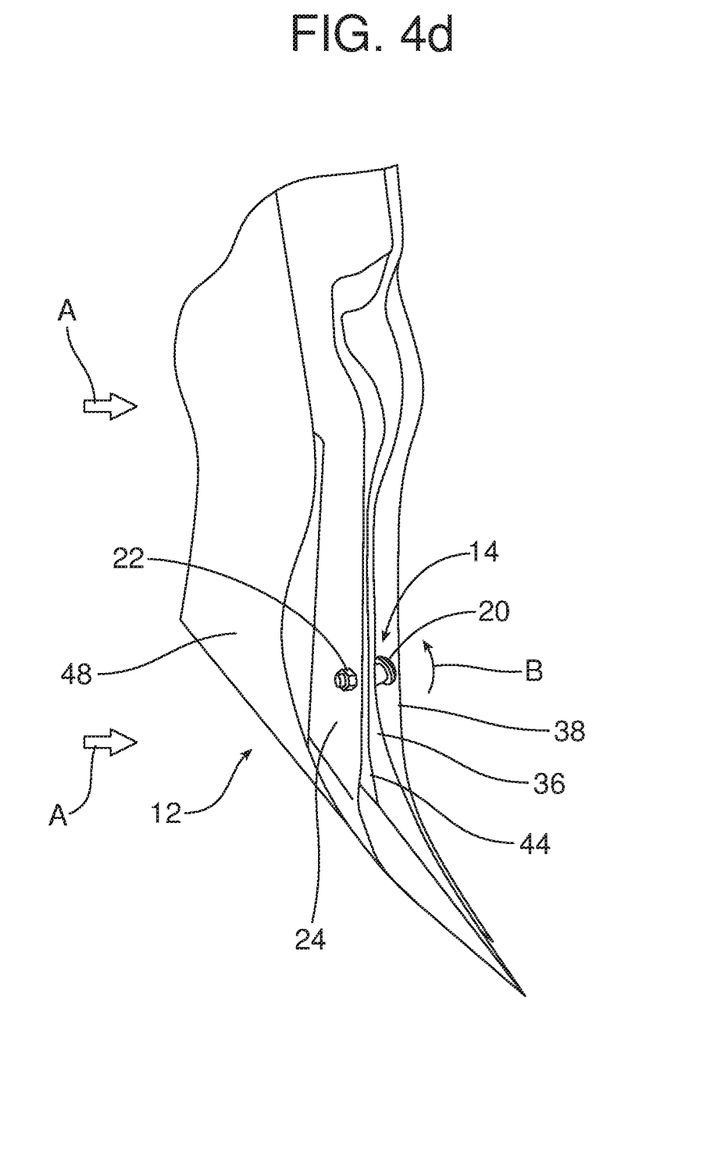
Figure 4E:
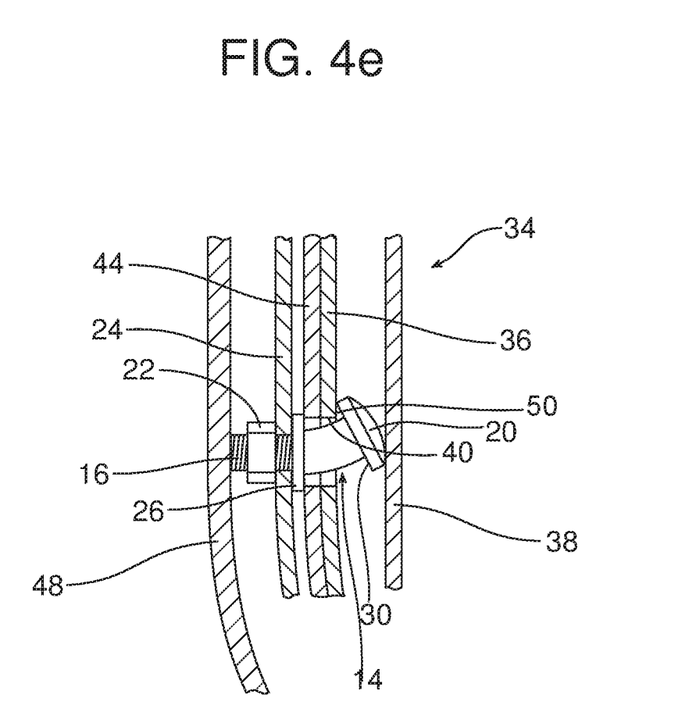

Milliseconds later, the enlarged head 20 on the pin 14 penetrates the second aperture 42 in the door opening panel 44 and the first aperture 40 in the outer rocker panel 36 (see FIG. 4c). Milliseconds after this, the enlarged head 20 of the pin 14 engages the inner rocker panel 38 causing the shank 18 of the pin 14 to bend in substantially any direction around the 360 degree arc of the shank 18 (see FIG. 4d). As the pin 14 bends, the continuous shoulder 30 of the enlarged head 20 is reoriented so that the shoulder engages the margin 50 of the outer rocker panel 36 outlining the aperture 40; that margin 50 being part of the receiver 32 (see FIG. 4e). This engagement serves to capture the pin 14 in the receiver 32 thereby locking the door 12 in the closed position. As should be appreciated, the fact that the shoulder 30 extends continuously around the enlarged head 20 and the margin 50 functions as a lip extending continuously around the receiver 32 means that the bending of the pin 14 along the shank 18 in substantially any direction results in the desired locking action and the securing of the door 12 in the closed position in response to substantially any side impact of sufficient force to cause the pin 14 to extend into the receiver 32.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A locking device for a door of a motor vehicle, comprising:
a pin including a first end fixed to said door and a second end including an enlarged head, wherein said pin is canted motor vehicle rearward when said door is closed; and
a receiver on a rocker panel of said motor vehicle wherein when said door is subjected to a side impact, said pin extends into said receiver and is captured.

2. The locking device of claim 1, wherein said pin includes a shank carrying said enlarged head.

3. The locking device of claim 2, wherein said first end is threaded.

4. The locking device of claim 3, further including a washer on said pin between said first end and said shank.

5. The locking device of claim 3, further including a screw drive in said enlarged head.

6. The locking device of claim 5, wherein said enlarged head forms a continuous shoulder around said shank.

7. The locking device of claim 6, wherein said receiver includes a cover closing said receiver.

8. The locking device of claim 7, wherein said receiver includes an aperture in an outer rocker panel of said motor vehicle and wherein said first end has a first diameter $D_1$, said shank has a second diameter $D_2$, said enlarged head has a third diameter $D_3$ and said aperture has a fourth diameter $D_4$ where $D_1 < D_2 < D_3 < D_4$.

9. The locking device of claim 8, wherein a first ratio of $D_1:D_2:D_3:D_4$ is between 1:1.23:1.98:2.98 and 1:1.43:2.18:3.18.

10. The locking device of claim 9, wherein said shank has a length $L_1$ of between 35 mm and 45 mm.

11. The locking device of claim 10, wherein said shoulder has a depth of between 4.0 mm and 5.0 mm.

12. The locking device of claim 10, wherein a second ratio of $D_2:L_1$ is between 1:2.25 and 1:2.75.

13. The locking device of claim 1, wherein said pin is canted motor vehicle rearward at an angle between 17 degrees and 23 degrees when said door is closed.

14. The locking device of claim 1, further including a screw drive in said enlarged head.

15. The locking device of claim 1, wherein said pin includes a shank and said enlarged head forms a continuous shoulder around said shank.

16. The locking device of claim 1, wherein said receiver includes a cover closing said receiver.

17. A method of locking a door of a motor vehicle closed in response to a side impact, comprising:
extending a pin on said door into a receiver on a rocker panel of said motor vehicle in response to said side impact;
penetrating a cover over said receiver when extending said pin into said receiver; and subsequently bending said pin so that a shoulder on said pin engages with a lip of said receiver to thereby capture said pin and lock said door closed.

18. The method of claim 17, further including providing said shoulder continuously around said pin and providing said lip continuously around said receiver.

\* \* \* \* \*